US006655037B2

(12) United States Patent
Götz et al.

(10) Patent No.: US 6,655,037 B2
(45) **Date of Patent: *Dec. 2, 2003**

(54) COORDINATE MEASURING APPARATUS HAVING A BENDING-RESISTANT MEASURING TABLE

(75) Inventors: Klaus-Dieter Götz, Sersheim (DE); Michael Trunz, Pfahlheim (DE); Heinz Broghammer, Zimmern (DE)

(73) Assignee: Carl-Zeiss-Stiftung, Heidenheim-Brenz (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/405,132

(22) Filed: Sep. 24, 1999

(65) Prior Publication Data

US 2002/0189117 A1 Dec. 19, 2002

(30) Foreign Application Priority Data

Mar. 16, 1999 (DE) .................................... 299 04 767 U

(51) Int. Cl.[7] ................................................ G01B 5/004
(52) U.S. Cl. .............................. 33/503; 33/567; 33/573
(58) Field of Search .......................... 33/503, 1 M, 549, 33/572, 573, 704, 567; 108/50.01, 57, 32, 161

(56) References Cited

U.S. PATENT DOCUMENTS

| | | | | |
|---|---|---|---|---|
| 326,925 | A | 9/1885 | Sundin | 33/567 |
| 1,157,762 | A | 10/1915 | Commons | 33/567 |
| 2,615,479 | A | 10/1952 | Bearup | 144/1.1 |
| 3,968,712 | A | 7/1976 | Duncan | 83/477.2 |
| 4,133,112 | A | 1/1979 | Matthiessen | 33/1 M |
| 4,255,862 | A | 3/1981 | Nakamura | 33/1 M |
| 4,763,420 | A | 8/1988 | McCabe et al. | 33/503 |
| 4,852,267 | A | 8/1989 | Tezuka | 33/503 |
| 5,123,317 | A | 6/1992 | Barnes et al. | 83/98 |
| 5,125,163 | A | 6/1992 | Bury | 33/503 |
| 5,247,749 | A | 9/1993 | Bury | 33/503 |
| 5,257,461 | A | 11/1993 | Raleigh et al. | 33/503 |
| D377,654 | S | 1/1997 | Jedlicka et al. | D15/133 |
| 5,778,548 | A | 7/1998 | Cerruti | 33/503 |
| 5,848,480 | A | 12/1998 | Sola et al. | 33/503 |
| 6,161,298 | A | 12/2000 | Bernhardt et al. | 33/702 |
| 6,188,150 | B1 | 2/2001 | Spence | 33/1 M |
| 6,202,316 | B1 | 3/2001 | Swift et al. | 33/503 |

FOREIGN PATENT DOCUMENTS

| | | |
|---|---|---|
| WO | WO 89/03505 | 4/1989 |

*Primary Examiner*—Diego Gutierrez
*Assistant Examiner*—R Alexander Smith
(74) *Attorney, Agent, or Firm*—Walter Ottesen

(57) ABSTRACT

A coordinate measuring apparatus includes a bending-resistant measuring table configured as a ribbed hollow body.

33 Claims, 4 Drawing Sheets

COORDINATE MEASURING APPARATUS HAVING A BENDING-RESISTANT MEASURING TABLE

FIELD OF THE INVENTION

The invention relates to a coordinate measuring apparatus having a measuring table resistant to bending.

BACKGROUND OF THE INVENTION

Coordinate measuring apparatuses of this kind have been known for some time from the state of the art. Two conventional variations for the measuring table are described below.

In a first variation, a granite block having the shape of a parallelepiped is used which is usually supported on a metal supporting frame. Although a granite block of this kind is especially well suited as a measuring table, the granite block has the special characteristic that it has a relatively large mass. This can lead to problems during transport or can limit considerably the possibilities for setting up the coordinate measuring apparatus.

A further variation comprises measuring plates made of cast iron. These measuring plates must be rigidly connected via a plurality of supporting elements to the foundation because of their inadequate bending stiffness and torsion stiffness. For this reason, a very complex adjustment of the measuring plate is needed. Furthermore, measuring plates of this kind can only be set up where a foundation is present so that the possibilities with respect to setting up are greatly limited.

SUMMARY OF THE INVENTION

It is an object of the invention to provide a coordinate measuring apparatus having an improved measuring table.

The invention is a coordinate measuring apparatus having a measuring table resistant to bending. The measuring table is configured as a ribbed-reinforced hollow body. It is also noted that the measuring table referred to herein is that component on which the workpiece to be measured is mounted.

A measuring table according to the invention has the significant advantage that it has a considerably lower mass than the known measuring tables made of granite. This simplifies transport and provides flexible possibilities with respect to the location of setup.

Compared to the known measuring plates made of cast iron, the measuring table according to a feature of the invention affords the advantage that it can be set up with considerably more flexibility because no foundation is required. Furthermore, a considerable simplification results for the setup of the measuring table because the setup and adjustment of the measuring table of the invention is considerably simplified. An elastic setup, for example, on damping elements is possible especially because of the considerably greater torsion stiffness and bending stiffness.

A coordinate measuring apparatus having a triangular ribbed component is disclosed in U.S. Pat. No. 4,763,420. Here, however, the concern is with only the subframe of the coordinate measuring apparatus. The measuring table, which is identified by reference numeral 10 in this publication, is however made, as known, from a heavy granite block in the same manner as the coordinate measuring apparatus described above so that even this coordinate measuring apparatus is subjected to the above-mentioned limitations with respect to assembly and the selection of the setup location.

In order to ensure the required stability, the measuring table region should be essentially triangularly rib reinforced. Triangular ribbed reinforcement is to be understood in the following as essentially linear ribs with the ribs being so mounted that a plurality of triangles are formed for a connection of different ribs to form geometrical figures.

The support points are those points on which the measuring table is supported and are advantageously arranged in such a manner that the ribs connect directly at the support points so that an optimal conduction of force is obtained and so that a high resistance to bending of the measuring table is achieved.

The measuring table can be configured as a welded construction. However, it is especially advantageous when the measuring table is a casting. The following materials can, for example, be used for this purpose: cast iron or mineral casting, such as polymer concrete.

The top side of the measuring table is completely closed; whereas, the lower side of the measuring table is interrupted by several holes which make possible access to the welding locations in the case of a welded construction. In the case of a casting, the holes serve as openings for the casting core.

The triangular ribbed region especially advantageously includes a rectangularly-shaped wall rib configuration which encloses the region of the triangular ribbed reinforcement. The support points are advantageously connected to the rectangularly-shaped wall rib reinforcement. In this way, an especially high stability is obtained.

An especially advantageous further improvement of the measuring table results when this table simultaneously takes over the function of the subframe so that the measuring table is then supported directly via corresponding feet on the foundation. This affords the special advantage that measuring table and supporting frame no longer have to be manufactured separately. For this case, the support points are pulled in somewhat from the outside of the measuring table because the feet (that is, the supporting blocks or even the damping elements on which the measuring table is mounted) have a defined lateral expansion and would otherwise extend laterally beyond the measuring table.

With the above-mentioned precondition that the support points are advantageously connected to the rectangularly-shaped wall rib reinforcement, the measuring table region is no longer supported in an outer region when the support points are pulled in from the outer side of the measuring table. In order to likewise support this outer region, further ribs can be provided which are perpendicular to the lateral wall rib reinforcement and support the overhanging measuring table region.

A further advantageous embodiment is provided when at least one side of the measuring table is used as a guide, that is, as a region in which the movable mechanism of the coordinate measuring apparatus can be movably guided. This feature affords the special advantage that no special component must be manufactured for the guidance region; instead, the measuring table can be manufactured all at one time. In contrast to the measuring table region, the region of the measuring table (which region is here arbitrarily designated the guide region) should be rectangularly rib reinforced; that is, the connection of the existing ribs to form geometric figures essentially only permits rectangles.

As described above, when the measuring table is simultaneously used as a subframe, the support points can be provided on the wall ribs which separate the measuring table region and the guide region from each other. This affords the special advantage that, on the one hand, the support points are connected to the lateral wall of the measuring table region and, on the other hand, the support points are also pulled in.

It is further noted with respect to the support points that each support point is part of at least one triangle which is formed of available ribs and within which triangle at least two further support points are located.

The number of support points are especially advantageous when three are selected because the measuring table is clearly determined with respect to its position.

The necessary stiffness of the measuring table can, however, be achieved only to a certain size of measuring table when there are three support points. When this size is reached, more support points must be used. Even for this case, the ribs are so arranged that each support point is a component of a triangle which is formed by available ribs and two further support points. The support points should then lie, for reasons of symmetry, at the corner locations of the triangle.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
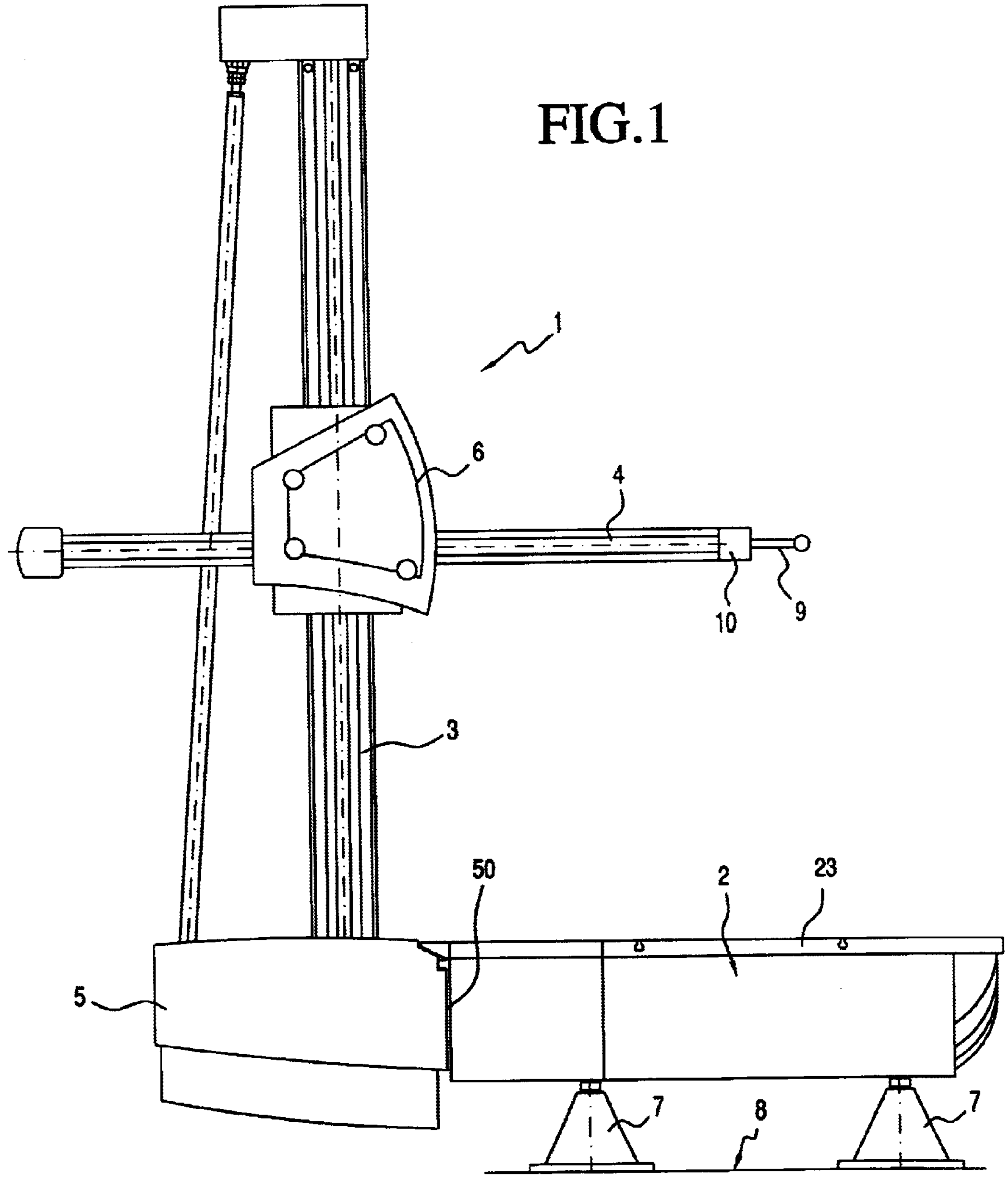
FIG. 1 is a side elevation view of a coordinate measuring apparatus according to the invention.

FIG. 1 shows a coordinate measuring apparatus having a measuring table according to the invention which is shown in side elevation. It is here noted that FIGS. 1 to 4*b* show the components of the coordinate measuring apparatus substantially reduced in scale; that, however, unessential details such as the control stand, et cetera, are omitted for the sake of clarity; and, that the openings for the casting cores in FIG. 3 are shown mostly round for the sake of simplification. However, the arrangement of the ribs shown in FIG. 2 correspond expressly to the measuring table according to the invention.

As shown in FIG. 1, the assembly of the coordinate measuring apparatus is here selected as the so-called stand assembly. The characteristic of this assembly is seen in the mechanism via which the probe pin 9 is driven in three mutually perpendicular measuring directions (x, y, z). For this purpose, the coordinate measuring apparatus has a so-called stand mechanism 1. The stand mechanism 1 is here mounted on a base 5. The base 5 can be driven perpendicular to the plane of the drawing laterally along the measuring table 2 on a corresponding guide means (not shown) at interface 50. A stand 3 is attached in the vertical direction to the base 5. A so-called cross slide 6 can be moved up and down on the stand 3. In the cross slide 6, a horizontally aligned measuring arm 4 is, in turn, movably journalled in the third spatial direction. A so-called probe head 10 is attached at the end of the measuring arm 4 and carries a probe pin 9. For driving the stand mechanism 1, drives (not shown) are provided in the stand mechanism which can be driven by the operator of the coordinate measuring apparatus via corresponding operator-controlled elements. In addition, scales (not shown) are mounted along the guides for driving the coordinate measuring apparatus in the three spatial directions. These scales are scanned by corresponding probe heads. For measuring a workpiece, the probe pin 9 is driven via the stand mechanism 1 so long until a contact with the workpiece, which is to be measured, is detected by the deflection of the probe pin 9 relative to the probe head 10. At this instant, the read-out measured values in the three mutually perpendicular spatial directions are stored so that a defined coordinate measuring value is retained.

It is understood that the stand mechanism shown here is simply exemplary and is representative of any one of many different coordinate measuring apparatus types. For example, the mechanism can be in the form of a portal mechanism or a bridge mechanism. The probe head can also be configured differently. For example, the probe head can also be a so-called measuring probe head or an optical probe head.

The workpiece to be measured is mounted on the measuring table 2 and the measuring table is supported via support mounts 7 on the foundation 8. The measuring table 2 of the invention will now be described in greater detail with respect to FIGS. 2*a* to 4*b*.

Figure 2A:
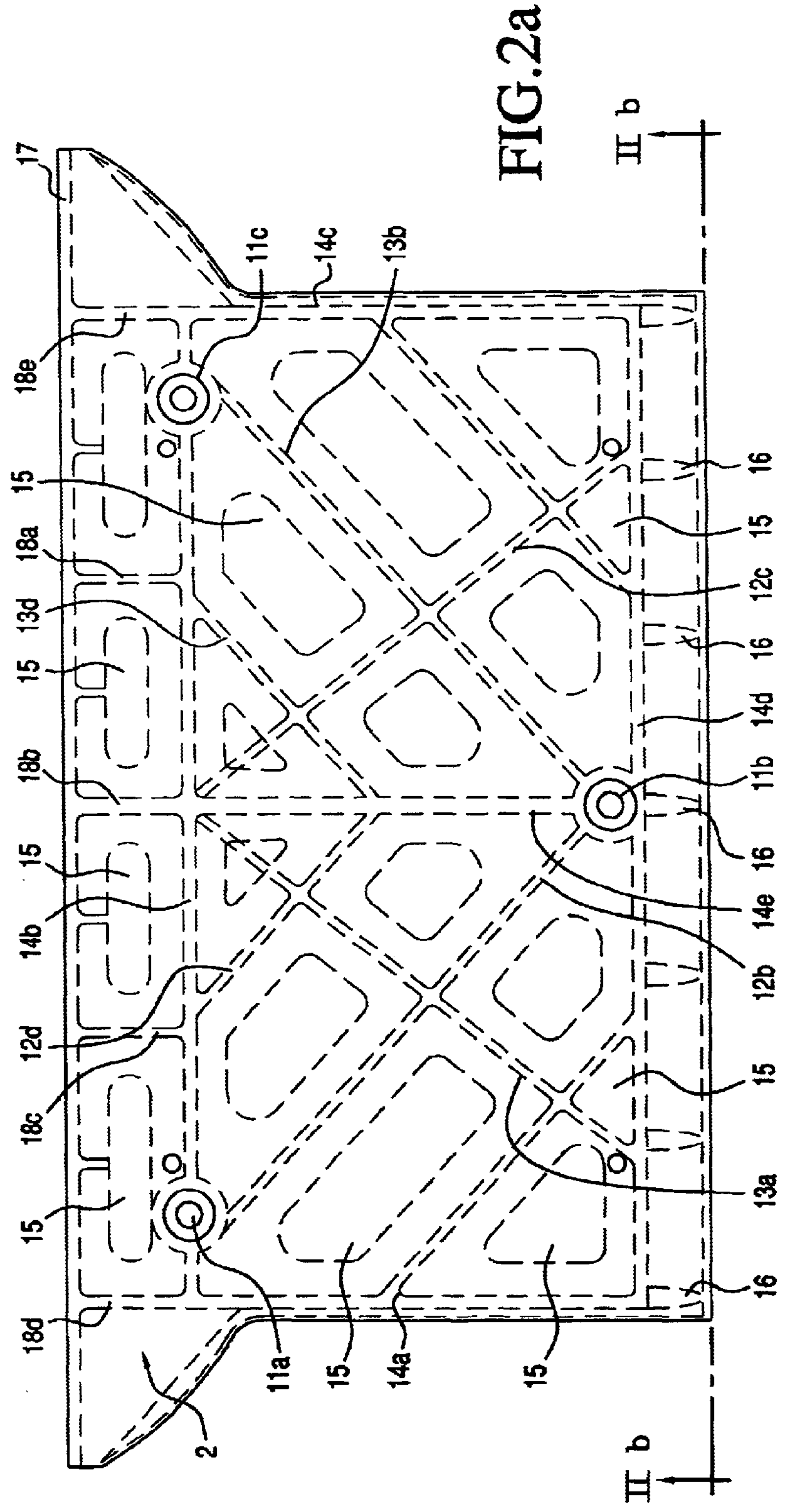
FIG. 2*a* is a plan view of the measuring table of the coordinate measuring apparatus of FIG. 1.
Figure 3:
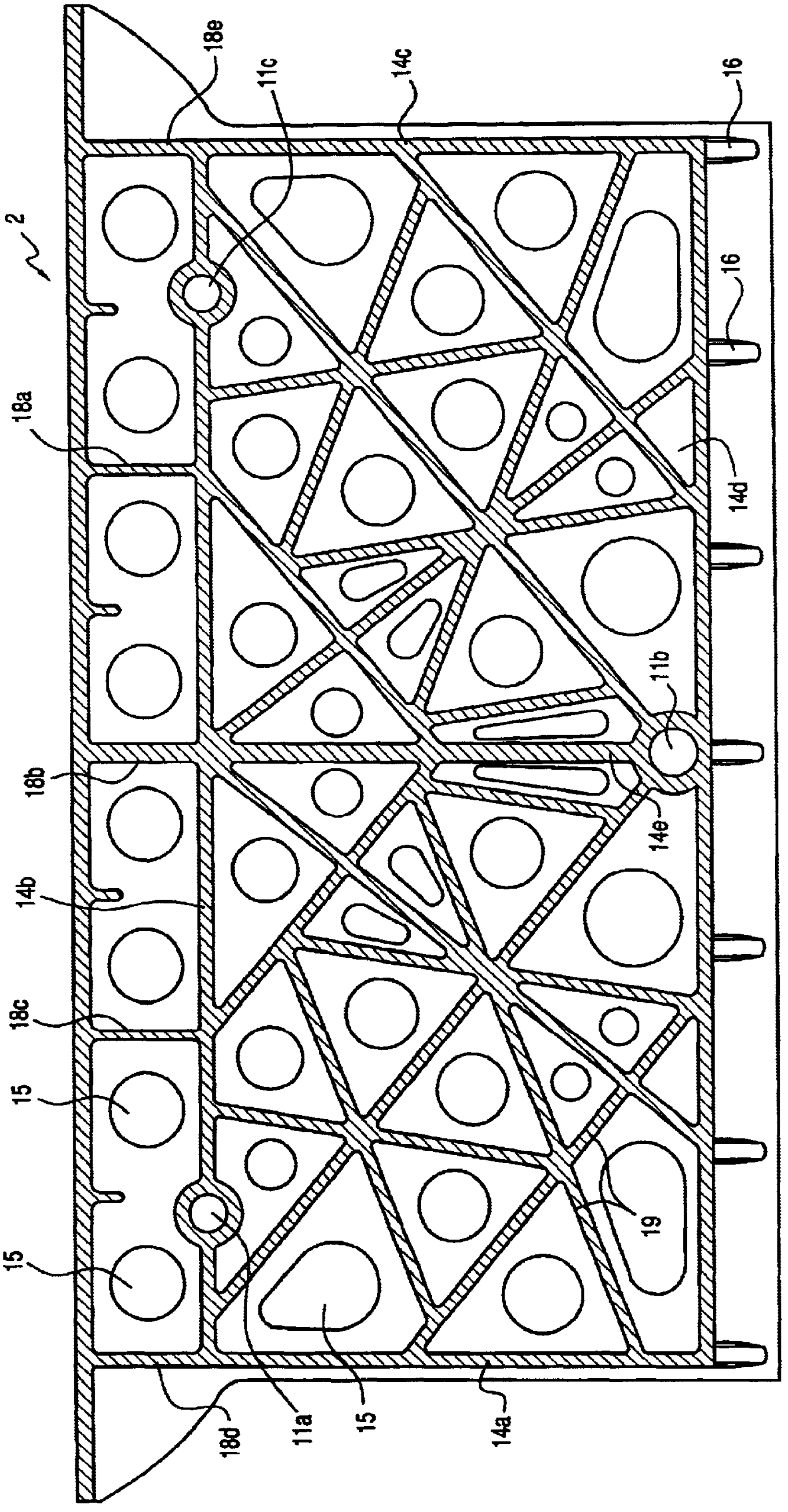
FIG. 3 is a section view taken through another embodiment of the measuring table for a coordinate measuring apparatus.

FIG. 2*a* is a plan view of a measuring table 2 according to an embodiment of the invention. As seen here, the measuring table is configured as a rib reinforced hollow body. In its central measuring table region, the measuring table is essentially triangular rib reinforced; that is, a plurality of triangles results from putting together different ribs to form geometric figures. For example, the ribs (12*b*, 13*b* and 14*b*) form a triangle. The ribs (13*a*, 12*c* and 14*d*) also form a triangle or the ribs (13*d*, 14*e* and 14*b*) define a triangle. As shown in FIG. 2*a*, a plurality of further triangles is formed by the ribs which, for the sake of simplicity, are all not individually identified.

The total triangular rib reinforcement is enclosed by a rectangular-shaped wall reinforcement (14*a* to 14*d*) with the support points (11*a* to 11*c*) being connected directly to the wall ribs (14*a* to 14*d*). The support points (11*a* to 11*c*) are those points on which the measuring table is seated upon the support mounts 7.

The central triangularly rib reinforced region is identified in the following as the measuring region of the table. In addition to this measuring region, there exists a region which, as mentioned above, is arbitrarily defined as a guide region on which the stand mechanism of the coordinate measuring apparatus is guided. In contrast to the measuring region, the guide region is rectangularly rib reinforced; that is, a plurality of rectangles is formed from the individual ribs (14*b*, 17 and 18*a* to 18*e*).

As shown, the guide region is likewise enclosed by a rectangularly-shaped wall rib reinforcement (14*b*, 18*e*, 17, 18*d*). In order to completely utilize the measuring region of the measuring table 2, the wall ribs 17 on the guide region side extend over the corner points of the rectangularly-shaped wall rib reinforcement (14*b*, 18*e*, 17, 18*d*) and therefore also the core region of the measuring table in the guide region in the longitudinal direction of the guide. In this way, the guide on which the stand mechanism is guided in accordance with FIG. 1 is extended relative to the actual measuring table so that the measuring arm 4 can extend over the entire region of the measuring table 2 in the direction of the guide.

Figure 2B:
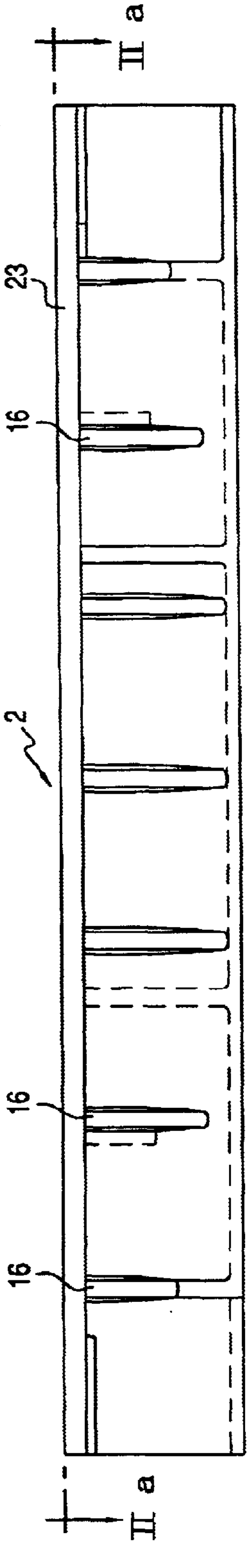
FIG. 2*b* is a side elevation view of the measuring table along line II*b*—II*b* of FIG. 2*a;*

Furthermore, the measuring table 2 at the same time assumes also the function of the previously known subframe so that the measuring table is directly supported via the support mounts 7 on the foundation 8 as already shown in FIG. 1. The measuring table can also be supported on the foundation 8 via other elements such as damping elements. The support mounts 7 or other elements have a defined lateral expansion. For this reason, the support points must be pulled in from the edge of the measuring table because the support mounts 7 would otherwise project beyond the edge of the measuring table 2. With the above-mentioned requirement of building the support points on the wall rib reinforcement of the triangular rib reinforced region, an advantageous solution results for the end of the guide region to arrange the support points (11*a*, 11*c*) between guide region and measuring table region. On the other end of the triangular rib reinforced region, the wall rib reinforcement 14*d* must be pulled in from the outer edge of the measuring table by a defined amount. However, to be able to also support the measuring table in this region, the region of the upper side 23 of the measuring table, which projects beyond the wall rib reinforcement 14*d,* is supported by ribs 16 which are perpendicular to the wall rib reinforcement as can be seen in FIG. 2*b*. FIG. 2*b* shows the measuring table 2 of FIG. 2*a* in a side elevation view as seen along line II*b*—II*b*.

Each of the support points (11*a* to 11*c*) is, together with the other two remaining support points, a component of a triangle which, referred to FIG. 2*a,* is formed from the ribs (12*b,* 13*b* and 14*b*). In this way, an especially stiff structure results so that the measuring table has a maximum bending stiffness. The body shown in FIG. 2*a* is a metal cast body wherein the upper side 23 of the measuring plate is seen in plan view and is completely closed. In contrast, the lower side has a plurality of openings 15 which are openings needed for the cast core for producing the measuring table.

FIG. 3 shows a second embodiment of the measuring table of the invention wherein the measuring table is here shown in section. The measuring table is essentially built up as the measuring table according to FIG. 2*a* and only the position of the support points, the arrangement of the ribs and the cast core openings differ with respect to the measuring table of FIGS. 2*a* and 2*b*.

Figure 4A:
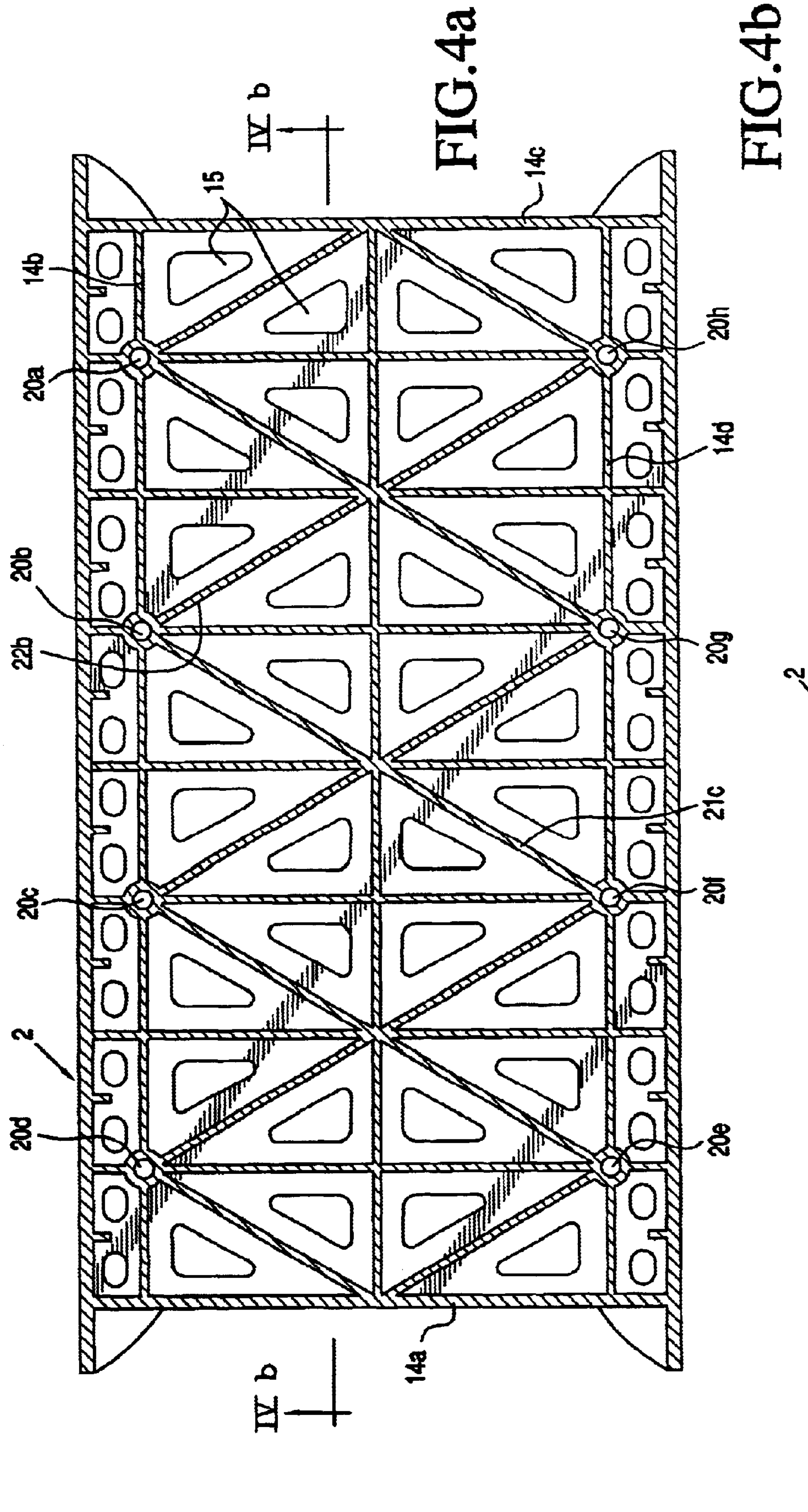
FIG. 4*a* is a section view through a third embodiment of a measuring table wherein respective guides for corresponding mechanisms of the coordinate measuring apparatus are provided on mutually opposite sides of the measuring table; and, FIG. 4*b* is a section view of the measuring table of FIG. 4*a* taken along line IV*b*—IV*b* of FIG. 4*a*.

FIG. 4*a* shows another embodiment of the measuring table of the invention. This measuring table is shown in section in the same manner as the measuring table of FIG. 3. The measuring table is essentially the same as the measuring table of FIG. 2*a*. However, as a difference to the measuring table of FIG. 2*a*, the measuring table shown in FIG. 4*a* has two guide regions which are each rectangularly rib reinforced. With this measure, it is possible to guide a stand mechanism on the measuring table 2 on both the left side of the measuring table as well as at the right side thereof so that the workpiece, which is to be measured, can be measured from both sides of the measuring table.

Figure 4B:
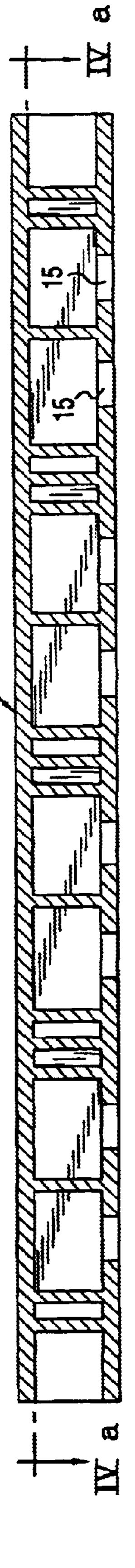

A further difference to the measuring table of FIG. 2*a* is that the measuring table of FIGS. 4*a* and 4*b* is substantially larger than the measuring table of FIG. 2*a*.

Because of the finite bending stiffness of the cast material, it is necessary to provide more than three support points (20*a* to 20*h*) in order to support the measuring table on the support mounts 7. Even though more than three support points are provided, it is apparent that each of the support points together with at least two further support points is part of a triangle formed from ribs. This is shown strictly as an example for the support points (20*b*, 20*f* and 20*h*). These three support points are part of a triangle which is made of the ribs (22*b*, 21*c* and 14*d*). The same applies to all other support points (20*a* to 20*h*).

It is understood that the foregoing description is that of the preferred embodiments of the invention and that various changes and modifications may be made thereto without departing from the spirit and scope of the invention as defined in the appended claims.

What is claimed is:

1. A coordinate measuring apparatus comprising:

a bending-resistant measuring table configured as a ribbed hollow body;

said measuring table having a table top of completely closed unitary construction;

said ribbed hollow body and said table top conjointly being a single cast body;

said table top having a central measuring region whereat measurements of a workpiece are made and having at least one guide region next to said central measuring region with said guide region including an upper surface;

said table top defining a single plane containing said central measuring region and said upper surface of said guide region; and, a measuring assembly movably guided on said guide region below said single plane.

2. The coordinate measuring apparatus of claim 1, said measuring region being essentially triangularly rib reinforced.

3. The coordinate measuring apparatus of claim 2, said measuring table having a bottom interrupted by openings.

4. The coordinate measuring apparatus of claim 2, said measuring table having a peripheral region enclosing said measuring region and the triangularly ribbed reinforcement; and, said peripheral region having a rectangularly-shaped wall reinforcement beneath said upper surface of said guide region.

5. The coordinate measuring apparatus of claim 4, said measuring table having a plurality of support points connected to said rectangularly-shaped wall reinforcement.

6. The coordinate measuring apparatus of claim 5, further comprising a plurality of support elements for supporting said support points, respectively, on a foundation.

7. The coordinate measuring apparatus of claim 6, wherein said support elements are at least one of support blocks and damping elements.

8. The coordinate measuring apparatus of claim 5, wherein said measuring table has a peripheral edge; and, said support points are pulled in from said peripheral edge.

9. The coordinate measuring apparatus of claim 8, said measuring table having a base structure incorporating said triangular reinforcement and said rectangularly-shaped wall reinforcement and a wall rib extending along said base structure; a top wall projecting outwardly beyond said base structure to define a projecting portion of said top wall and said projecting portion defining said peripheral edge; and, a plurality of wall ribs extending perpendicularly to said wall rib for supporting said projecting portion.

10. The coordinate measuring apparatus of claim 4, said rectangular rib structure including a rectangular wall ribbing encompassing said guide region.

11. The coordinate measuring apparatus of claim 10, wherein said rectangular wall ribbing encompasses said central measuring region and at least a portion of said guide region.

12. The coordinate measuring apparatus of claim 11, wherein said rectangular wall ribbing defines corner points and said measuring table has a top wall defining said measuring region and said guide region and said top wall extending outwardly beyond said rectangular wall ribbing in the longitudinal direction of said guide region.

13. The coordinate measuring apparatus of claim 1, wherein said measuring table is cast of cast iron or a mineral casting including polymer concrete.

14. The coordinate measuring apparatus of claim 1, said measuring table having a plurality of reinforcement ribs arranged to define a triangular reinforcement of said measuring table; and, at least three support points being components of said triangular reinforcement.

15. The coordinate measuring apparatus of claim 14, wherein said support points are three in number.

16. The coordinate measuring apparatus of claim 14, wherein said measuring table includes three support points and each of said support point being in a corner of at least a triangle of said triangular reinforcement.

17. The coordinate measuring apparatus of claim 1, said measuring table further including a rectangular rib structure for supporting said guide region.

18. A coordinate measuring apparatus comprising:

a bending-resistant measuring table defining a longitudinal axis and configured as a ribbed hollow body;

said measuring table having a table top of completely closed unitary construction and having first and second longitudinal ends;

said ribbed hollow body and said table top conjointly being a single cast body;

said table top having a central measuring region extending between said first and second longitudinal ends whereat measurements of a workpiece are made and said table top having a guide region extending in the direction of said longitudinal axis next to said central measuring region;

said measuring table being configured with said guide region extending a predetermined distance beyond each of said first and second longitudinal ends;

a measuring assembly for making measurements on a workpiece placed on said central measuring region; and, said measuring assembly being movably guided along the entire length of said guide region including beyond said longitudinal ends so as to permit measurements to be made on the workpiece irrespective of where on said central measuring region the workpiece is placed wherein said guide region includes an upper surface and said table top defines a single plane containing said central measuring region and said upper surface of said guide region.

19. The coordinate measuring apparatus of claim 18, said measuring region being essentially triangularly rib reinforced.

20. The coordinate measuring apparatus of claim 19, said measuring table having a bottom interrupted by openings.

21. The coordinate measuring apparatus of claim 19, said measuring table having a peripheral region enclosing said measuring region and the triangularly ribbed reinforcement; and, said peripheral region having a rectangularly-shaped wall reinforcement beneath said guide region.

22. The coordinate measuring apparatus of claim 21, said measuring table having a plurality of support points connected to said rectangularly-shaped wall reinforcement.

23. The coordinate measuring apparatus of claim 22, further comprising a plurality of support elements for supporting said support points, respectively, on a foundation.

24. The coordinate measuring apparatus of claim 23, wherein said support elements are at least one of support blocks and damping elements.

25. The coordinate measuring apparatus of claim 22, wherein said measuring table has a peripheral edge; and, said support points are pulled in from said peripheral edge.

26. The coordinate measuring apparatus of claim 25, said measuring table having a base structure incorporating said triangular reinforcement and said rectangularly-shaped wall reinforcement and a wall rib extending along said base structure; a top wall projecting outwardly beyond said base structure to define a projecting portion of said top wall and said projecting portion defining said peripheral edge; and, a plurality of wall ribs extending perpendicularly to said wall rib for supporting said projecting portion.

27. The coordinate measuring apparatus of claim 21, said rectangular rib structure including a rectangular wall ribbing at said guide region.

28. The coordinate measuring apparatus of claim 27, wherein said rectangular wall ribbing encompasses said central measuring region.

29. The coordinate measuring apparatus of claim 18, wherein said measuring table is cast of cast iron or a mineral casting including polymer concrete.

30. The coordinate measuring apparatus of claim 18, said measuring table having a plurality of reinforcement ribs arranged to define a triangular reinforcement of said measuring table; and, at least three support points being components of said triangular reinforcement.

31. The coordinate measuring apparatus of claim 30, wherein said support points are three in number.

32. The coordinate measuring apparatus of claim 30, wherein said measuring table includes three support points and each of said support point being in a corner of at least a triangle of said triangular reinforcement.

33. The coordinate measuring apparatus of claim 18, said measuring table further including a rectangular rib structure for supporting said guide region.

* * * * *